Patented June 30, 1931

1,812,316

UNITED STATES PATENT OFFICE

ERNST BERL, OF DARMSTADT, GERMANY

METHOD FOR MAKING ACTIVE CHARCOAL

No Drawing. Application filed December 30, 1927, Serial No. 243,769, and in Germany January 21, 1927.

This invention relates to a method for making active charcoal of excellent properties and consists in treating acid sludges, obtained when refining crude oil distillations or fractions of coal tar with sulfuric acid, with activating means.

According to the invention acid sludges especially so-called water soluble acid sludges are first neutralized with alkaline reacting substances especially alkaline reacting potassium compounds such as potassium carbonate, potassium hydroxide or potassium sulfide; the products obtained by neutralization are then activated by heating them to temperatures used in the art for activating charcoal. It is of advantage that the solutions obtained by neutralization of the acid sludges should be first evaporated to dryness; the solid mixtures obtained in this way are then heated to activating temperatures e. g. between 800 and 1200° C. especially to temperatures of about 1100° C. The heating period may for example be ½ hour to 3 hours. It is preferable to heat the substances obtained by neutralization and eventually evaporation in presence of oxidizing gases or vapors such as air, oxygen, carbon dioxide, water vapor or mixtures of several of these substances for example water vapor containing flue gases.

In order to remove neutral oils or sulfur or sulfur containing compounds or substances of both kinds from the products obtained by neutralization one may for example first heat these dried products to moderate temperatures for example between 300 and 400° C., especially to 350° C., until the sulfur or the neutral oils or both these substances are removed; then the temperature is raised to that degree necessary for activation for example to 1100° C. Generally it has proved to be of advantage, when the dried and heated material is brought immediately to activating temperatures by quickly raising the temperatures.

After the activating heating the obtained product is cooled for example in an atmosphere or a gas stream such as flue gases, nitrogen or the like free from air or by adding for example water. The material may then be freed from inorganic substances for example by treatment with water or soluble aqueous solutions such as highly diluted hydrochloric acid. It has been found to be of advantage, when this extraction process is followed by a further glowing process in an atmosphere free from or poor in oxygen. The temperature to which the dried material has to be brought lies preferably between 600 and 800° C.

The new method allows the use of extremely cheap raw materials, not useful elsewhere. The obtained active charcoals have a very great surface and an extraordinary adsorbing power, which is greater than that of any one of the known charcoals used for decoloration of liquids or adsorption of gases or vapors.

The excellent qualities of the active charcoals obtained according to the invention may be easily proved by the following methods.

I. Methylene—blue—method 0.1 g. of the finely powdered charcoal passing a 4900 mesh screen, are shaken in a closed tube by a shaking machine for 2 hours with 60 c. c. of a solution of methylene blue, containing 1.5 g. methylene blue (Merck) in 1000 c. c. water. The dyestuff not adsorbed by the charcoal is determined in a Leitz colorimeter after the separation of the charcoal from the solution. As 1 mg. of adsorbed methylene blue requires 1 sq. m. surface of the charcoal, this method allows a quick and easy determination of the surfaces of different kinds of charcoal. The charcoals obtained according to the invention have surfaces of more than 700 sq. m. per g. for example 800–900 sq. m., the medium value being 850 sq. m. The known charcoals have a far less surface when testing them in the described manner.

II. Benzene—method

1½ g. of the charcoal to be tested are covered by pouring them with 10 c. c. benzene. The rise in temperature, then taking place, is a measure for the adsorbing power of the charcoals.

Active charcoals made according to the invention show temperature raises of more than 11.5° C. for example of 12–14° C. and more. The known active charcoals generally give values below these temperatures, when testing them as described.

*III. Ether test (published Zeitschrift für angewandte Chemie, 1921, vol. 34 page 368, 377)*

Into a U-shaped tube, filled with active charcoal, are poured different amounts of ether. By shaking the tube, the ether is uniformly distributed in the carbon. The amount of charcoal and ether used are determined by weighing. Then the gas stream of ether vapor and air is passed through the gas interferometer of Haber-Löwe in a gas chamber of one meter length and the vapor pressure of the ether is determined according to the formulas given in the above mentioned publication. In such a treatment 100 g. of an active charcoal according to the invention adsorb from a gas stream of ether vapor and air with 8.25 g. ether per cu. m. generally more than 35 g. ether for example 43–53 g. ether and more. Similar high values are not obtained, when testing the usual active charcoal as described.

I claim:

1. A method for making active charcoal which consists in treating acid sludges derived from the treatment of hydrocarbons with neutralizing agents and heating the obtained mixture to a temperature of approximately 800° C. to 1200° C.

2. A method for making active charcoal which consists in treating acid sludges derived from the treatment of hydrocarbons with alkaline reacting potassium compounds and heating the obtained mixture to a temperature of approximately 800° C. to 1200° C.

3. A method for making active charcoal which consists in treating acid sludges derived from the treatment of hydrocarbons with neutralizing agents, drying the product obtained and heating the dried product to a temperature of approximately 800° C. to 1200° C.

4. A method for making active charcoal which consists in treating acid sludges derived from the treatment of hydrocarbons with neutralizing agents and activiting the product obtained by neutralization by heating it to activating temperatures in presence of oxidizing gases or vapors.

5. A method for making active charcoal which consists in treating acid sludges derived from the treatment of hydrocarbons with neutralizing agents, drying the product obtained by neutralization, removing volatile impurities by a pre-heating of the dried product and heating the pre-heated product to a temperature of approximately 800° C. to 1200° C.

6. A method for making active charcoal which consists in treating acid sludges derived from the treatment of hydrocarbons with alkaline reacting potassium compounds, activating the obtained product by heating and freeing the activated product from soluble inorganic substances.

7. A method for making active charcoal which consists in treating acid sludges derived from the treatment of hydrocarbons with alkaline reacting potassium salts, heating the dried product to temperatures between 800 and 1200° C., cooling the heated product and removing the inorganic substances from the cooled product by aqueous extraction.

8. A method for making active charcoal which consists in treating acid sludges derived from the treatment of hydrocarbons with neutralizing substances, activating the product obtained by neutralization, by heating, freeing the activated product from inorganic substances and heating the obtained purified product.

9. A method for making active charcoal which consists in treating acid sludges derived from the treatment of hydrocarbons with alkaline reacting potassium compounds, evaporating to dryness the solution obtained, removing the volatile impurities by heating the dried product, activating the purified product by heating it to activation temperatures, cooling the activated product, extracting the impurities by leaching the cooled product, drying the leached product and heating the dried product.

10. As a new article of manufacture an active charcoal derived from hydrocarbon acid sludges having by the methylene blue test an active surface of more than 700 sq. m. per g.

11. As a new article of manufacture an active charcoal derived from hydrocarbon acid sludges of which 1.5 g. in mixture with 10 c. c. benzene cause a rise of temperature of at least 11.5° C.

12. As a new article of manufacture an active charcoal derived from hydrocarbon acid sludges of which 100 g. adsorb from a gas mixture of ether vapor and air, containing 8.25 g. ether per c. c., more than 35 g. ether.

13. As a new article of manufacture an active charcoal obtained by carbonization of acid sludges derived from the treatment of hydrocarbons of which charcoal 1 g. has an active surface of more than 700 sq. m., 1.5 g. in mixture with 10 c. c. benzene, cause a rise of temperature of at least 11.5° C. and 100 g. adsorb from an ether vapor—air stream, containing 8.25 g. ether per c. c., more than 35 g. ether.

In testimony whereof I affix my signature.

Prof. Dr. ERNST BERL.